United States Patent

[11] 3,615,703

| [72] | Inventors | Yujiro Harada;<br>Yasushi Kanzaki; Hideyuki Furukawa;<br>Kazuo Yamazaki; Hideki Matsuo, all of<br>Tokyo-to, Japan |
|---|---|---|
| [21] | Appl. No. | 769,726 |
| [22] | Filed | Oct. 22, 1968 |
| [45] | Patented | Oct. 26, 1971 |
| [73] | Assignee | Kyowa Hakko Kogyo Kabushiki Kaisha,<br>(Kyowa Hakko Kogyo Co., Ltf.)<br>Tokyo-to, Japan |
| [32] | Priorities | Oct. 23, 1967 |
| [33] | | Japan |
| [31] | | 42/67838;<br>Oct. 23, 1967, Japan, No. 42/67837; June 23, 1969, Japan, No. 44/50121 |

[54] RETAINING THE FRESHNESS OF FOODSTUFFS
5 Claims, No Drawings

[52] U.S. Cl. .................................................... 99/154,
99/28, 99/48, 99/150 R, 99/155, 99/186, 99/211,
99/214
[51] Int. Cl. ........................................ A23b 7/00,
A23l 3/00
[50] Field of Search ............................. 99/28–31,
48, 54, 150, 155, 99, 105, 211, 214, 186

[56] References Cited
UNITED STATES PATENTS

| 2,374,407 | 1/1942 | Block et al. ................... | 99/54 X |
| 2,627,465 | 2/1953 | Pettibone ..................... | 99/99 X |
| 2,806,791 | 9/1957 | Frieden et al. ................. | 99/48 |
| 2,992,114 | 7/1961 | Weaver ........................ | 99/155 X |
| 3,024,272 | 3/1962 | Hyson et al. ................... | 99/150 X |
| 3,175,910 | 3/1965 | Fukaya et al. ................. | 99/31 X |

FOREIGN PATENTS

| 562,192 | 8/1958 | Canada ........................ | 99/54 |

*Primary Examiner*—Lionel M. Shapiro
*Assistant Examiner*—D. M. Naff
*Attorney*—Meyer A. Gross ABSTRACT: This invention relates to a process and composition for retaining the freshness of foodstuffs involving the addition of at least one member selected from the group consisting of lysine, ornithine, histidine, arginine and salts thereof to the foodstuff so as to thereby retain its freshness. This invention is useful for preserving foodstuffs for a long period of time without any deteriorative influence upon their qualities.

RETAINING THE FRESHNESS OF FOODSTUFFS

BACKGROUND OF THE INVENTION

The freshness of fruit juice, vegetable juice, processed fruits and vegetables, and soft drinks packed in a can, bottle or the like may deteriorate by heating in the course of preparation so as to discolor, deteriorate in taste or flavor and possibly acquire a disagreeable smell, such as can smell or bottle smell. Alcoholic beverages such as beer and nonalcoholic or carbonated drinks may also degenerate when kept for a long period of time. Sometimes, the ingredients of packaged foodstuffs, specifically canned or bottled foodstufs such as fruits, are subjected to color changes and those such as beer are liable to suffer the deminution of foam-retention when stored for a long period of time. Such defects reduce the commercial values of the foodstuffs, specifically of packaged foodstuffs. Glutamic acid is known as taste-enhancer, but it is difficult to retain the freshness of foodstuffs by using amino acid for those stored for a long period of time. This invention is based on the discovery that the freshness of certain foodstuffs can be retained by using certain amino acids as set forth below.

SUMMARY OF THE INVENTION

According to the present invention, there is provided a process for retaining the freshness of foodstuffs, especially packaged nonmeat foodstuffs which comprises the step of adding to the foodstuff at least one member selected from the group consisting of lysine, ornithine, histidine, arginine and salts thereof.

This invention is additionally directed to the provision of foodstuffs capable of retaining its freshness when stored for a long period of time by virtue of said foodstuffs containing at least one member selected from the group consisting of lysine, ornithine, histidine, arginine and salts thereof, for retention of freshness.

According to this invention, it is possible to prevent the deterioration of the freshness of various foodstuffs such as, for example, processed and packaged foodstuffs and of packaged beverages at large such as canned or bottled alcoholic or nonalcoholic drinks. By addition of the amino acids of this invention, the deterioration of taste and of flavor, color changes and changes of appearance as well as the generation of a disagreeable smell such as can smell, sunburned smell or bottle smell can be eliminated, even when stored for extended periods of time. Moreover, the foam-retention of sparkling wines such as beer can be held back by addition of the amino acids of this invention even when stored for a long period of time.

The amino acids which may be used for the purpose of this invention are lysine, ornithine, histidine and arginine. They may be used either in the free form or in the salt form as formed with an acid, such as hydrochloride, sulfate, phosphate, inosinate or succinate, or in the form of salt formed with an alkali metal such as sodium.

Amino acids are known compounds and are stable to heat and inert to various other compositions commonly included in foodstuffs so that it is possible to add the amino acids of this invention to foodstuff at any stage of its preparation. In other words, they can be added to finished, precooked or raw foodstuffs if desired. It is also possible to use the amino acids of this invention together with other substances conventionally used, e.g., for processing, cooking, flavoring or preserving purposes. For example, it is possible to use the amino acids of this invention together with ascorbic acid which is conventionally used for preserving purpose.

The use of the amino acids of this invention results in retaining effectively the freshness of foodstuffs thereby it is possible to preserve foodstuffs, specifically packaged foodstuffs without deterioration of various characteristic features thereof such as, e.g., flavor, taste, outlook, color, clarity of liquid, etc. for a long period of time.

The amount of the amino acid added to the foodstuff may vary, depending on various factors such as, e.g., seasoning agents, flavoring agents, bitters, table salt etc. The preferred amount is from 0.001 to 4.0 percent by weight of the foodstuff when it is added in the free form, and from 0.001 to 5.0 percent by weight of the foodstuff when it is used in the salt form. When it is added to the liquid foodstuff or foodstuff containing large amount of liquid, as for example to sparkling wines, fruit juice, carbonated drinks and other beverages, it is preferred to use the amino acid in the free form in an amount of from 0.001 to 0.4 percent by weight of the foodstuff, or in the salt form 0.001 to 0.5 percent by weight of the foodstuff, because an excessive amount of the amino acid can give rise to various defects such as, for example, changes of color and of taste, etc.

When the amino acids of this invention are used for preparing specifically canned or bottled fruits, fruit juice etc., the treated products can be preserved for a long period of time without any deteriorative influence for example, upon color, outlook, clarity, taste, flavor, etc. For example, a disagreeable smell and deminution of taste and of flavor can be prevented by the addition of the amino acids of this invention.

When the amino acids of this invention are used for the preparation of sparkling wines such as beer, or carbonated drinks, the gas maintenance in carbonated drinks and the foam retention of sparkling wines can also be greatly improved.

When the amino acids of this invention are used for the preparation of sparkling wines, for example, it is preferred to use 10 to 200 g. of lysine in the salt form per 10 kg. of the dried malt, but it is also possible to use lysine (in the salt form) in an amount of from 5 to 100 g. per 50 l. of beer obtained. For instance, the amino acids of this invention can be added to the green malt, or if desired, it is also possible to add it after malt-drying step, although better results may be obtained by using the amino acid in the earlier stage.

Analogous good results may also be obtained by adding the amino acids of this invention to any sparkling wine.

PREFERRED EMBODIMENTS

The following nonlimitative examples illustrate the invention.

EXAMPLE 1

Samples of canned peach were prepared in the following manner.

After removing the core, a peach (Okubo-type peach available in common market in Japan) was soaked in water containing 3 percent NaCl (by weight of water). After peeling, the peach (weight—275 g.) as packed in a can (capacity—454 c.c.), into which a syrup having the following composition was poured in an amount of 160 g. Air was exhausted from the can at 95° C. for 5 minutes. After sealing in vacuo, the can was heated to 90° to 95° C. for 20 minutes for sterilization, and was then cooled. Similar procedures were performed by using four types of the syrups, which has the following compositions:

| Syrup | Composition (% by weight) |
| --- | --- |
| 1 | sugar 43% |
| 2 | sugar 43%, sodium isoascorbinate 0.1% |
| 3 | sugar 43%, sodium isoascorbinate 0.1%, and L-lysine hydrochloride 0.1% |
| 4 | L-lysine hydrochloride 0.1%, and sugar 43%. |

Each sample was stored for 6 months in room temperatures and was then opened to determine the freshness regarding to the taste, flavor and appearance. For this purpose, a functional test was carried out by using Kramer's method. The results obtained are shown in table 1, in which a test panel consisting of 15 testers was used.

TABLE 1

| Sample | 1 | 2 | 3 | 4 |
|---|---|---|---|---|
| Total ranking | 60 | 45 | 17** | 26* |

Remarks: 1) *significance difference at a risk of 5%.
2) **significance difference at a risk of 1%.

As shown in Table 1, the flavor was significantly preserved by using L-lysine HCl, in particular, by using L-lysine HCl together with sodium isoascorbinate owing to their synergitic effects. The combined use of L-lysine HCl with sodium erythorbinate was superior at a level of significance of 1 percent to the sole use of sodium isoascorbinate and to the control sample, and the sole use of L-lysine HCl was superior to the samples 1 and 2. With regard to the outlook and maintenance of shape, the samples 3 and 4 were superior to those of the samples 1 and 2. It was also determined that by the addition of L-lysine HCl the flavor was largely improved and the can smell was entirely removed, while samples 1 and 2 had more or less a can smell. With respect to the taste, the samples containing L-lysine HCl had a rich and complicated taste, while the control sample had a monotonic taste. The sample containing sodium isoascorbinate had a strongly acidic taste, and the syrup added with L-lysine HCl has a higher clarity than those without the addition of L-lysine HCl. The control syrup had a considerable turbidity.

EXAMPLE 2

Samples of canned mandarine orange juice were prepared in the following manner. Raw oranges (Unshu-type mandarine orange available from common market in Japan) were well washed with water and squeezed to obtain orange juice, which was centrifuged and packed in an amount of 250 g. in a can (capacity—273 cc.). After sealing in vacuo, the ingredients were sterilized at 90° C. for 10 minutes. Ten kilograms of the product obtained had a concentration of juice of 70 percent by weight and its composition was as follows:

| Mandarine orange | 7 kg. |
|---|---|
| Sugar | 0.84 kg. |
| Water | 2.16 kg. |

L-lysine HCl (0.1 percent by weight) was added to the juice. The juice was canned and stored for 6 months. After this, the sample was subjected to a functional test by means of two-points discrimination method using 15 testers and was compared with a control sample prepared in a similar manner to that described above without addition of L-lysine HCl. The obtained significance differences are shown in table 2.

From this table, it is apparent that the addition of L-lysine HCl resulted in good preservation of the mandarine orange juice with regard to freshness and color changes. In addition, the control sample had a can smell and inferior freshness, which could be improved by the use of L-lysine HCl.

TABLE 2

| Sample | Total ranking |
|---|---|
| With addition of lysine | 12 |
| Without addition of lysine. | 3 |

EXAMPLE 3

In preparing a canned tomato juice, tomatoes of market grade were well washed with water, removed of carpophore, etc., and crushed by means of a conventional crusher. After heated to 80° C. it was squeezed and table salt was added. The juice was canned in a can (capacity—208 cc.) which was sealed in vacuo and sterilized at 95° C. for 25 minutes to prepare a sample. The composition of the sample (per 10 kg.) was as follows:

| Tomato juice | 9.95 kg. |
|---|---|
| Salt | 0.05 kg. |

L-lysine monophosphate, L-ornithine HCl, L-arginine HCl and L-histidine HCl (0.05 percent by weight each) were added respectively to individual samples. The cans were stored for 6 months and a functional test was carried out by using a similar manner to that described in example 2 to obtain the significance differences shown in the following tables.

From the results shown in these tables it is apparent that the treatment of the present invention helped preserve tomato juice. A control sample which did not contain any of the amino acids was also prepared in a similar manner to that described above. Two-point discrimination method was performed by using a test panel consisting of 15 testers to obtain the results with a significance difference respectively of 1 percent (table 3), 1 percent (table 4), and 5 percent (tables 5 and 6).

TABLE 3

| Sample | Control | With addition of L-lysine HCl |
|---|---|---|
| Total of testers (15 testers) | 2 | 13 |

Significance difference 1%.

TABLE 4

| Sample | Control | With addition of L-ornithine HCl |
|---|---|---|
| Total of testers (15 testers) | 2 | 13 |

Significance difference 1%.

TABLE 5

| Sample | Control | With addition of L-arginine HCl |
|---|---|---|
| Total of testers (15 testers) | 3 | 12 |

Significance difference 5%.

TABLE 6

| Sample | Control | With addition of L-histidine HCl |
|---|---|---|
| Total of testers (15 testers) | 3 | 12 |

Significance difference 5%.

EXAMPLE 4

A carbonated drink containing orange juice (10 percent by volume) was prepared by using a raw orange juice obtained in a similar manner to that described in example 2 (10 L.), sugar (13 kg.), citric acid (200 g.), orange base (130 ml.) and orange essence (20 ml.). They were well mixed and L-lysine HCl (50 g.) was added. After this, the solution was made up with water to 100 l. in total. This was bottled in bottles (each 200 ml.), sealed, sterilized and cooled in conventional manner to give samples. A control sample was also prepared in a similar manner to that described above except for the addition of L-lysine HCl. All samples were stored for 3 months and analyzed in a similar manner to that described in example 3 to obtain the results shown in table 7.

It is apparent from table 7 that the addition of L-lysine HCl was significantly effective in retaining the freshness of the carbonated drink.

TABLE 7

| Sample | Control | With addition of L-lysine HCl |
|---|---|---|
| Total ranking | 5 | 15 |

Significance difference 5%, 20 testers.

What is claimed is:

1. A process for retaining the freshness of packaged foodstuffs, selected from the group consisting of fruits, fruit juices, vegetables, and vegetable juices which comprises the steps of adding to said foodstuffs 0.001 to 5 percent by weight of said foodstuffs a free amino acid selected from the group consisting of lysine, ornithine, histidine, arginine, and nontoxic salts thereof, for retaining the freshness of said foodstuff, and packaging and sterilizing said amino acid containing foodstuff.

2. The process of claim 1, in which the amino acid is in the form of a salt selected from the group consisting of hydrochloride, sulfate, phosphate, succinate, inosinate and sodium salts.

3. The process of claim 1, in which the amino acid is added in the free form in an amount of from 0.001 to 4.0 percent by weight of the foodstuff.

4. A packaged foodstuff made by the process of claim 1.

5. The foodstuff of claim 4 which is a liquid.